(12) United States Patent
Howell (10) Patent No.: US 9,599,260 B1
(45) Date of Patent: Mar. 21, 2017

(54) PIPE COUPLING

(71) Applicant: Larry D. Howell, Longview, TX (US)

(72) Inventor: Larry D. Howell, Longview, TX (US)

( * ) Notice: Subject to any disclaimer, the term of this patent is extended or adjusted under 35 U.S.C. 154(b) by 308 days.

(21) Appl. No.: 14/534,366

(22) Filed: Nov. 6, 2014

Related U.S. Application Data

(63) Continuation-in-part of application No. 13/761,805, filed on Feb. 7, 2013, now Pat. No. 8,882,154.

(60) Provisional application No. 61/600,914, filed on Feb. 20, 2012.

(51) Int. Cl.
*F16L 17/00* (2006.01)
*F16L 17/10* (2006.01)

(52) U.S. Cl.
CPC .................................. *F16L 17/10* (2013.01)

(58) Field of Classification Search
USPC .... 285/100, 15, 96, 97; 277/605; 138/97, 99
See application file for complete search history.

(56) References Cited

U.S. PATENT DOCUMENTS

| | | | |
|---|---|---|---|
| 2,465,848 A | 3/1949 | Collins et al. | |
| 2,523,716 A | 9/1950 | Parr | |
| 2,742,305 A | 4/1956 | Converse, III et al. | |
| 3,023,995 A | 3/1962 | Hopkins | |
| 3,033,594 A | 5/1962 | Cushman | |
| 3,420,554 A | 1/1969 | Straub | |
| 3,810,665 A | 5/1974 | Rodgers | |
| 3,843,167 A | 10/1974 | Gronstedt | |
| 4,026,584 A | 5/1977 | Lowe | |
| 4,202,379 A | 5/1980 | Vetter | |
| 4,276,945 A | 7/1981 | Ward, Sr. | |
| 4,448,218 A | 5/1984 | Vetter | |
| 4,741,561 A | 5/1988 | Morita et al. | |
| 4,772,050 A | 9/1988 | Buehler et al. | |
| 4,786,087 A | 11/1988 | Thewlis et al. | |
| 5,066,208 A * | 11/1991 | Warmerdam | F16L 55/16455 138/93 |
| 5,333,916 A | 8/1994 | Burkit et al. | |
| 5,595,405 A | 1/1997 | Kuntsen | |
| 5,868,524 A | 2/1999 | Martin | |
| 8,419,071 B2 | 4/2013 | Gentille | |

OTHER PUBLICATIONS

BlueScope Pipeline Supplies, Processing Capabilities, photo of grooving pipe coupling, www.bluescopepipelinesupplies.com.au/processing-capabilities, Jan. 28, 2013, 2 pages.
BlueScope Pipeline Supplies, photo of pipe coupling, www.bluescopepipelinesupplies.com/au/sites/default/files, Jan. 28, 2013, 1 page.

\* cited by examiner

*Primary Examiner* — Aaron Dunwoody
(74) *Attorney, Agent, or Firm* — Geoffrey A. Mantooth; Brian K. Yost (57) ABSTRACT

A pipe coupling has an outer shell with a flexible inner liner therein. The liner is secured to the shell by a clamping arrangement, which uses inner rings at the ends of the shell and an inner ring intermediate of the ends. The inner rings are hydraulically expanded out to the shell to form a seal between the shell and the liner at the ends and to retain the liner to the shell at the intermediate ring. In use, compressed fluid is provided to cavities between the liner and the shell to force the liner to seal against a pipe joint. The intermediate inner ring prevents the intermediate portion of the liner from expanding into the pipe joint. A protective handle is provided.

19 Claims, 7 Drawing Sheets

PIPE COUPLING

This application is a continuation-in-part application of Ser. No. 13/761,805, filed Feb. 7, 2013, which claims the benefit of U.S. provisional patent application Ser. No. 61/600,914 filed Feb. 20, 2012.

FIELD OF THE INVENTION

The present invention relates to couplings for sealing a pipe joint.

BACKGROUND OF THE INVENTION

There are many applications where a quick, efficient way to join lengths of pipe together in a leak proof manner is needed. For example, pipe conveying water to a work site, such as an oil or gas well site, requires couplings between the lengths of pipe. The pipe itself lacks structure for joining one length of pipe to another, so couplings about the exterior of the pipe joints are used.

The prior art has numerous types of couplings. One type of prior art pipe coupling uses a gasket between the adjacent ends of a pipe. A metal band clamps around the gasket and the outside diameter of the pipe, with the band fitting into circumferential grooves in the pipe. Another type of pipe coupling uses an HDPE sleeve over the pipe joint. The sleeve is welded into place with electro-fusion. Still another type of coupling uses a rubber sleeve inside of a rigid shell. The coupling is fit over the pipe joint. Compressed air expands the rubber sleeve around the pipe joint, forming a seal. This type of coupling is exemplified by U.S. Pat. No. 4,026,584.

These prior art couplings either leak, or are too expensive, or are difficult to install.

Furthermore, prior art couplings that use expandable sleeves about the pipe joint may have reduced lifetimes if used on a pipe joint where the end of the pipes are not abutting, but are instead separated by a gap. The sleeve expands into the gap and is subjected to potential damage. U.S. Pat. Nos. 3,420,554 and 3,810,665 disclose a ring to prevent the bladder from entering any gap between the pipe ends, but installing and using the ring is cumbersome.

SUMMARY OF THE INVENTION

A pipe coupling has an outer cylindrical shell with first and second ends. An elastomeric sleeve is located inside of the outer shell and has respective first and second end portions, and an intermediate portion. The intermediate portion is located between the respective first and second end portions. An inner ring is located inside of the sleeve intermediate portion. The inner ring is pressed out to the shell to retain the sleeve intermediate portion to the shell. The sleeve end portions are sealed to the outer shell. First and second cavities are between the shell and the sleeve. The first cavity is between the sleeve intermediate portion and one of the sleeve end portions and the second cavity is between the sleeve intermediate portion and the other of the sleeve end portions. The shell has at least one opening that communicates with the first and second cavities. The sleeve has expandable portions that form the first and second cavities, the expandable portions are movable relative to the shell. The shell, the sleeve and the inner ring form an interior for receiving a pipe joint, wherein the expandable sleeve portions expand to seal around the pipe joint, the inner ring preventing the retained sleeve intermediate portion from expanding into the pipe joint.

In accordance with one aspect, the sleeve has a single wall with outer and inner surfaces, with the outer surface at the sleeve intermediate portion in contact with the shell and the inner surface of the sleeve intermediate portion in contact with the intermediate inner ring.

In accordance with another aspect, the sleeve intermediate portion is a solid wall.

In accordance with another aspect, the inner ring is hydraulically expanded to the shell.

In accordance with another aspect, the inner ring is an intermediate ring. The coupling further comprises respective first and second endmost inner rings located at the respective sleeve first and second end portions. The first and second endmost inner rings are pressed out to the shell to form the seals of the sleeve end portions to the shell.

In accordance with another aspect, at least one passage is formed on an inside surface of the shell, the passage extends from the shell opening to one of the first and second cavities.

In accordance with another aspect, the opening in the shell is a first opening. The first opening communicates with the first cavity. The pipe coupling further comprises a second opening in the shell that communicates with the second cavity.

In accordance with another aspect, the sleeve has a single wall with outer and inner surfaces, with the outer surface at the sleeve intermediate portion in contact with the shell and the inner surface at the sleeve intermediate portion in contact with the inner ring. The sleeve intermediate portion is a solid wall. The inner ring is hydraulically expanded to the shell. The inner ring is an intermediate ring, further comprising respective first and second endmost inner rings located at the respective sleeve first and second end portions. The first and second endmost inner rings are pressed out to the shell to form the seals of the sleeve end portions to the shell.

In accordance with another aspect, the pipe coupling further comprises a handle. The handle comprises two handle supports coupled to the shell and extending radially therefrom. The handle supports are spaced apart longitudinally on an exterior of the shell. The opening is located between the handle supports. The handle also comprises a member radially spaced apart from the shell and extending between the handle supports.

In accordance with another aspect, each of the handle supports comprises two legs coupled to the shell and extending radially from the shell. The legs are spaced circumferentially apart on the shell, wherein the handle forms a protective cage about the shell opening.

A pipe coupling has an outer cylindrical shell with first and second ends. An elastomeric sleeve is located inside of the outer shell and has respective first and second end portions, and an intermediate portion. The intermediate portion is located between the respective first and second end portions. An inner ring is located inside of the sleeve intermediate portion. The sleeve intermediate portion is compressed between the shell and the inner ring so as to be retained to an inside surface of the shell. The sleeve end portions being sealed to the outer shell. First and second cavities are located between the shell and the sleeve. The first cavity is located between the sleeve intermediate portion and one of the sleeve end portions and the second cavity is located between the sleeve intermediate portion and the other of the sleeve end portions. The shell has at least one opening that communicates with the first and second cavity. The sleeve has expandable portions that form the first and second cavities, the expandable portions being movable relative to the shell. The shell and the inner ring form an interior for receiving a pipe joint, wherein the expandable sleeve portions expand around the pipe joint. The inner ring prevents the retained sleeve intermediate portion from expanding into the pipe joint.

In accordance with another aspect, the inner ring is hydraulically expanded to the shell.

In accordance with another aspect, the sleeve has a single, solid wall with outer and inner surfaces, with the outer surface at the sleeve intermediate portion in contact with the shell and the inner surface at the sleeve intermediate portion in contact with the inner ring.

In accordance with another aspect, the inner ring is an intermediate ring. The coupling further comprises respective first and second endmost inner rings located at the respective sleeve first and second end portions. The first and second endmost inner rings are pressed out to the shell to form the seals of the sleeve end portions to the shell.

In accordance with another aspect, the opening in the shell is a first opening. The first opening communicates with the first cavity. The pipe coupling further comprises a second opening in the shell that communicates with the second cavity.

In accordance with another aspect, the inner ring is hydraulically expanded to the shell. The sleeve has a single, solid wall with outer and inner surfaces, with the outer surface at the sleeve intermediate portion in contact with the shell and the inner surface at the sleeve intermediate portion in contact with the inner ring. The inner ring is an intermediate ring. The coupling further comprises respective first and second endmost inner rings located at the respective sleeve first and second end portions. The first and second endmost inner rings are pressed out to the shell to form the seals of the sleeve end portions to the shell.

In accordance with another aspect, the pipe coupling further comprises a handle. The handle comprises two handle supports coupled to the shell and extending radially therefrom. The handle supports are spaced apart longitudinally on an exterior of the shell, the opening being located between the handle supports. The handle also comprises a member radially spaced apart from the shell and extending between the handle supports.

In accordance with another aspect, each of the handle supports comprises two legs coupled to the shell and extending radially from the shell. The legs are spaced circumferentially apart on the shell, wherein the handle forms a protective cage about the shell opening.

DESCRIPTION OF THE PREFERRED EMBODIMENTS

Figure 1:
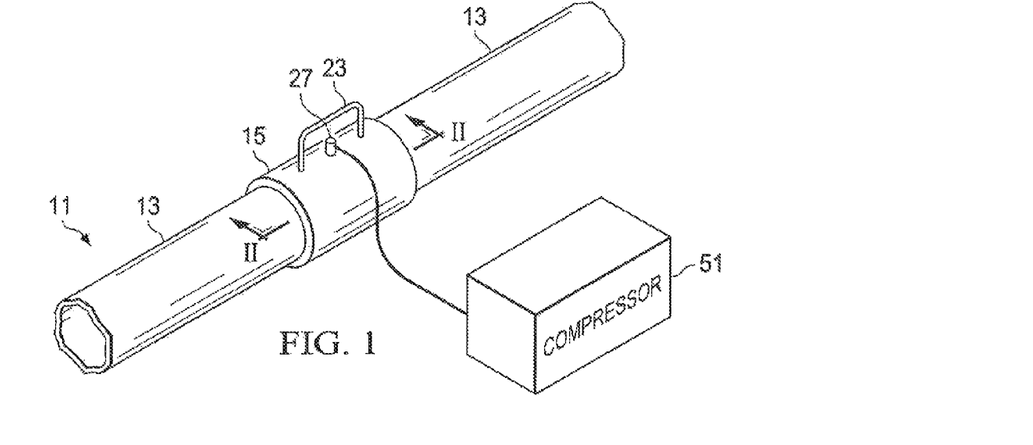
FIG. 1 is a perspective view of a pipeline utilizing the pipe coupling.
Figure 2:
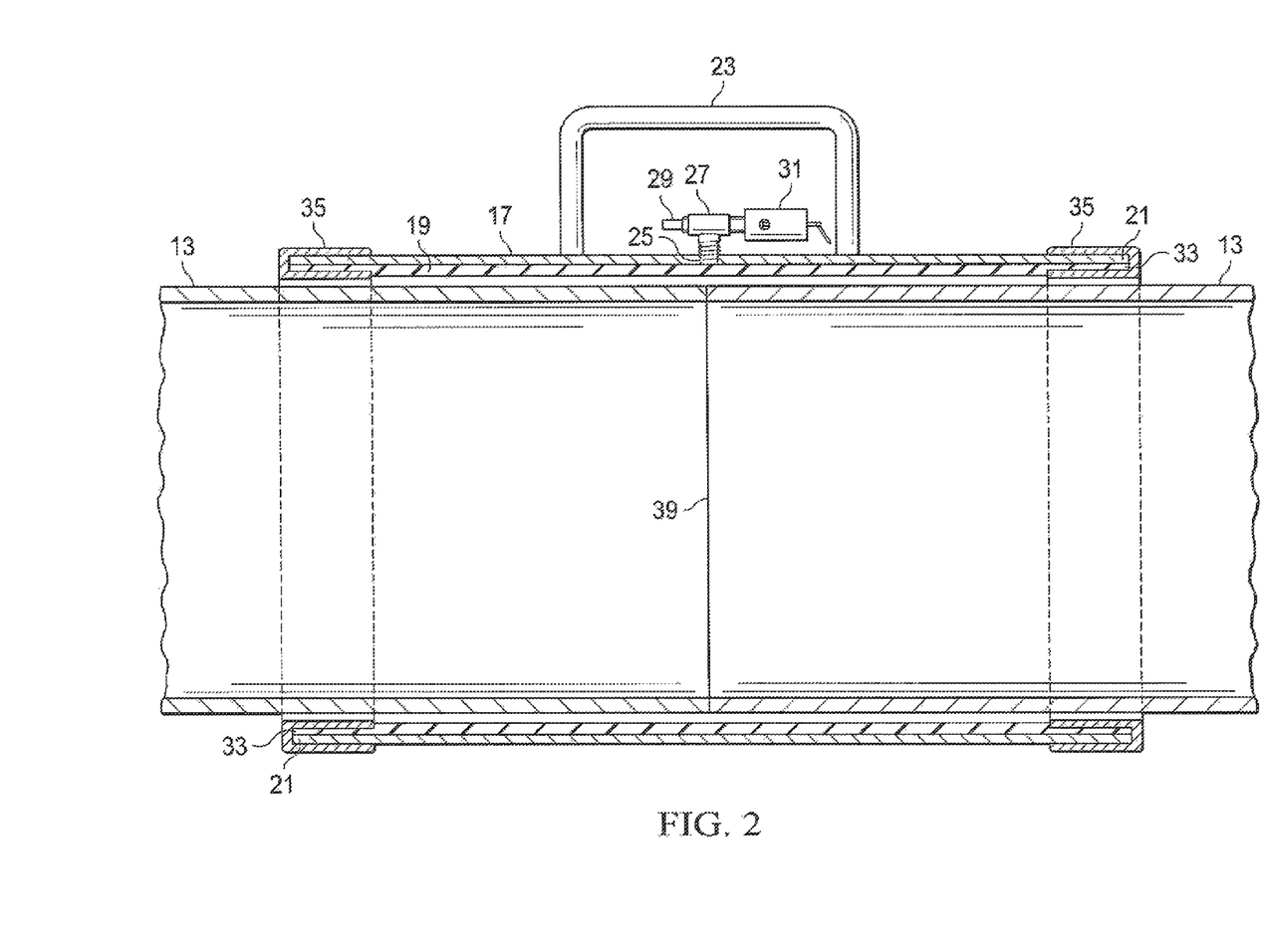
FIG. 2 is a cross-sectional view of the pipe coupling installed on a pipe joint, but not yet inflated.
Figure 6:
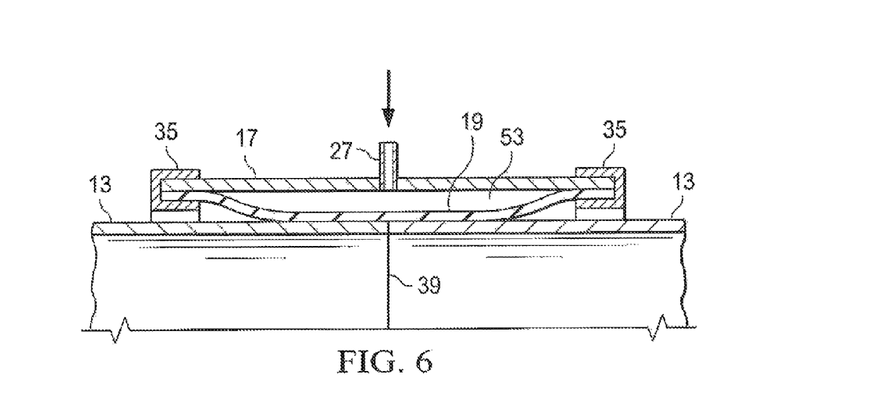
FIG. 6 is a cross-sectional view of a portion of the pipe coupling shown inflated and providing a seal around the pipe joint.

FIG. 1 shows a pipeline 11 equipped with the pipe coupling 15. The pipeline is made up of lengths of pipe 13. The pipe 13 can be of any dimension. The pipe can be of any pipe material, such as aluminum, steel, cast iron, plastic, composite, etc. The pipe can be used for most applications. For example, the pipe can carry water such as potable, non-potable, or sewer water. The pipe comes in lengths, which lengths are joined together by the pipe coupling 15. The ends of the pipe 13 need not have threads or any of the like. Instead, as shown in FIGS. 2 and 6, the ends can be butted against one another. A coupling 15 is used for each pipe joint.

The pipe coupling provides an inexpensive, easy to use, reliable, leak proof coupling. The coupling can be made with few components so as to reduce the cost. Provided with a handle and light in weight, the coupling can easily be installed onto the pipe ends and pipe joint. Sealing the pipe joint merely provides providing compressed air or some other fluid inside the coupling. Once the seal is made, the coupling holds the seal for the duration of the pipeline.

The coupling also allows the pipeline to be easily disassembled. The coupling can be reused.

In the description that follows, like reference numbers mean like components.

Figure 3:
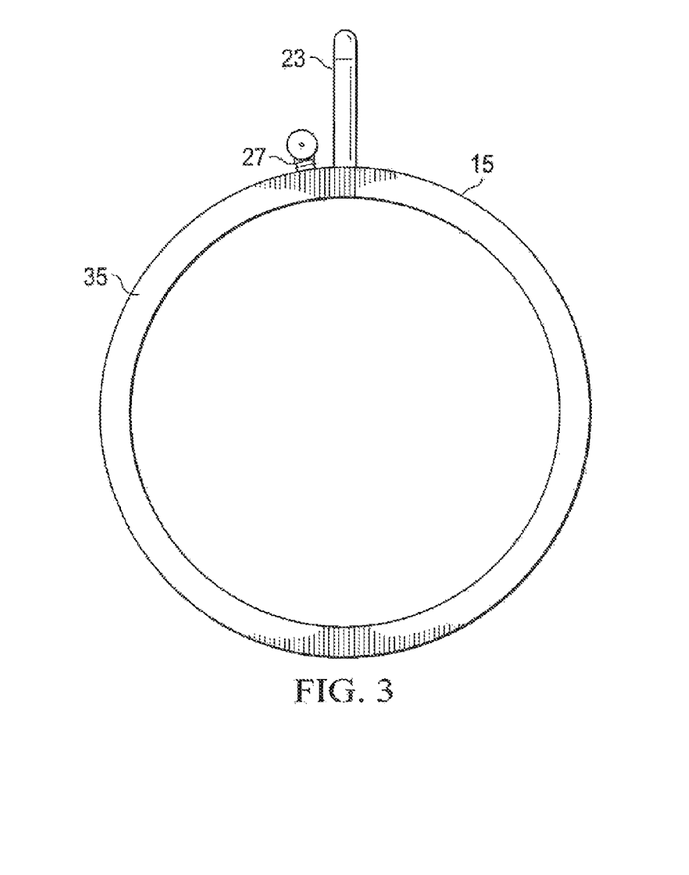
FIG. 3 is an end view of the pipe coupling.
Figure 4:
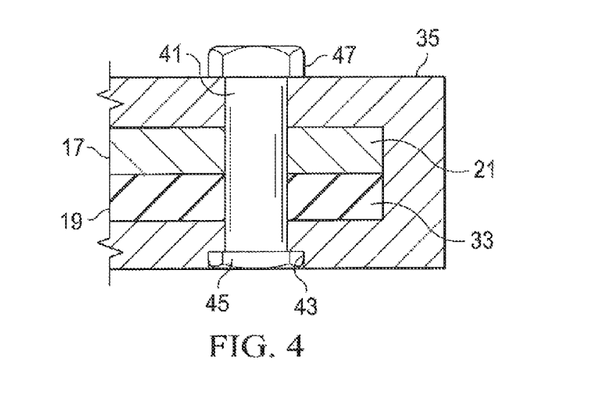
FIG. 4 is a detail cross-sectional view of a clamp showing one arrangement.

Referring to FIGS. 2-4, the pipe coupling 15 has an outer shell 17 and an inner liner or shell 19. The inner liner 19 is nested or located inside of the outer shell 17.

The outer shell 17 is typically made of metal, although it could be made of other material, such as plastic or composite. The outer shell is pipe-like, having an inside diameter and two ends 21. The outer shell has a wall thickness. The wall thickness is selected based upon the particular application. Higher pipeline pressures require a larger outer shell wall thickness than do lower pressures. For example, for a water pipe of less than 100 psi, an aluminum outer shell can have a wall thickness of ⅛"-3/16". A handle 23 projects out from the outer shell. The handle is useful for putting the coupling in place on the pipeline.

The outer shell has an opening 25 therein; the opening is equipped with a fitting 27 and a valve 29. The valve is normally closed. In the preferred embodiment, the fitting 27 is centered between the two ends 21. The fitting can optionally be provided with a pressure relief valve 31.

The inner liner 19 is elastomeric and can be made of rubber (such as gum rubber) or other materials. The inner liner can withstand contact with the fluids in the pipeline without disintegrating or becoming leaky. The inner liner is also pipe-like, or a sleeve, and has two ends 33. The length of the inner liner is the same as the length of the outer shell. The outside diameter of the inner liner is slightly smaller than the inside diameter of the outer shell. It is preferred if the inner liner fits inside of the outer shell such that the inner liner presents a smooth inside surface and is free of wrinkles. The thickness of the inner liner is sufficient for it to withstand the pipe pressures without damage such as rupture. The inner liner 19 has a wall of uniform thickness. The inside surface of the inner liner is smooth, with no protrusions.

The ends 21, 33 of the outer shell and inner liner are coupled together by clamps 35. Each clamp is a metal ring having a "C" shape in cross-section, as shown in FIGS. 2 and 4. The respective ends 21, 33 of the outer shell 17 and inner liner 19 are inserted into a clamp. Sealant is provided between the clamp and the outer shell, the clamp and the inner liner and between the outer shell and inner liner. Once the ends of the outer shell and inner liner are installed in the clamp, the free ends of the clamp are squeezed or clamped together. A hydraulic crimping unit can be used to squeeze or crimp the clamps 35.

The clamps can be provided with radially extending bolts 41 for increased mechanical coupling. Referring to FIG. 4, which shows a detail view corresponding to the clamp portion in the upper right of FIG. 2, each clamp 35 has a series of bolts extending from the inside diameter out. The bolts extend through the inner liner 19 and the outer shell 17. The bolt head 45 is located in a countersink 43 so as to be flush with the clamp inside diameter. The bolt can be a hex drive type. A nut 47 is located on the bolt, on the outside diameter of the clamp. The bolts 41 are spaced out circumferentially around each clamp 35.

Figure 5:
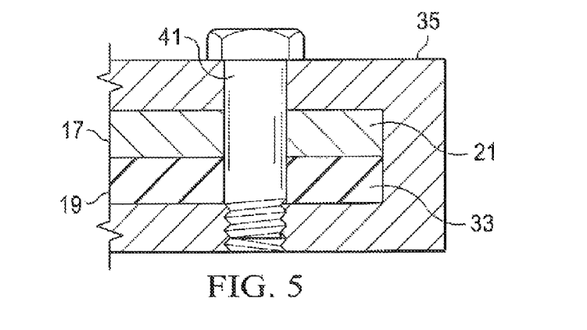
FIG. 5 is a detail cross-sectional view of a clamp showing another arrangement.

Still another clamp arrangement is shown in FIG. 5. Bolts 41 extend radially inward from the outside diameter. The bolt head bears on the outside diameter of the clamp. The inside portion of each clamp is threaded to receive the bolt 47. The threaded end of the bolt should either be flush or recessed with the clamp inside diameter to avoid interfering with the sealing function of a coupling. The bolts 41 are provided circumferentially around each clamp 35.

Figure 7:
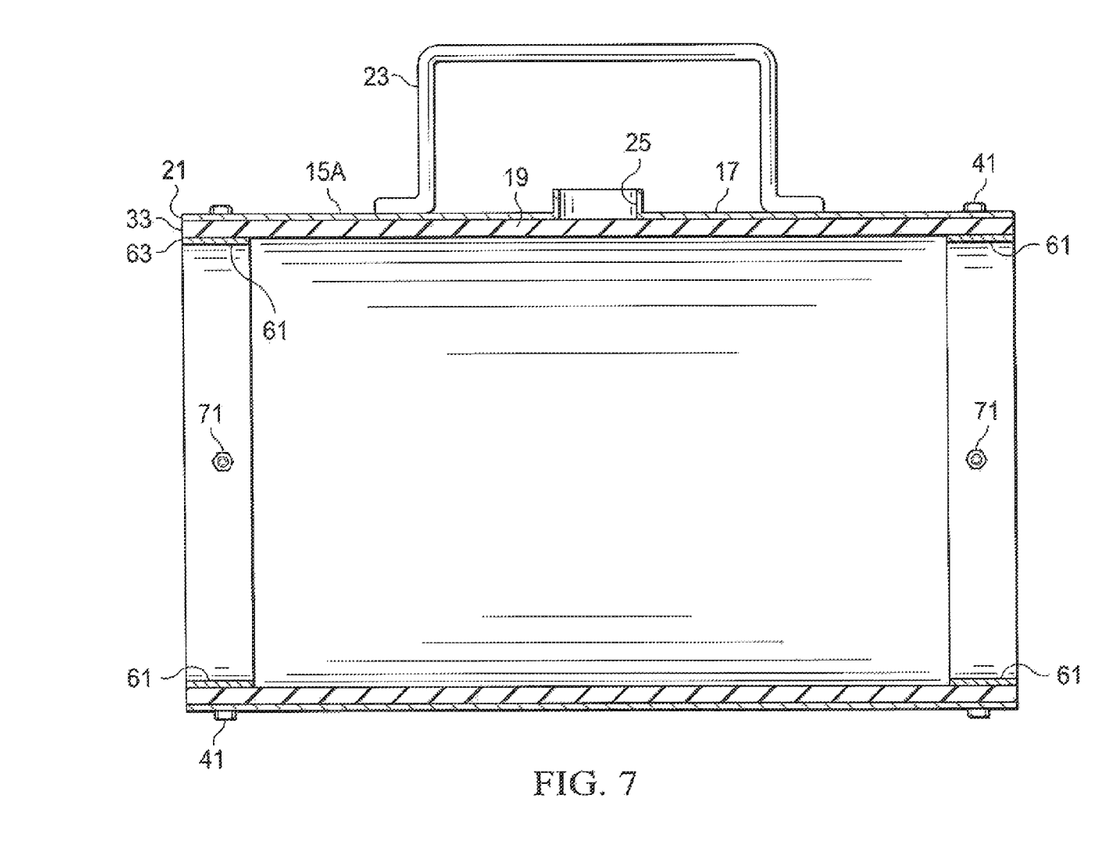
FIG. 7 is a longitudinal cross-sectional view of the pipe coupling in accordance with another embodiment taken along lines VII-VII of FIG. 8.
Figure 8:
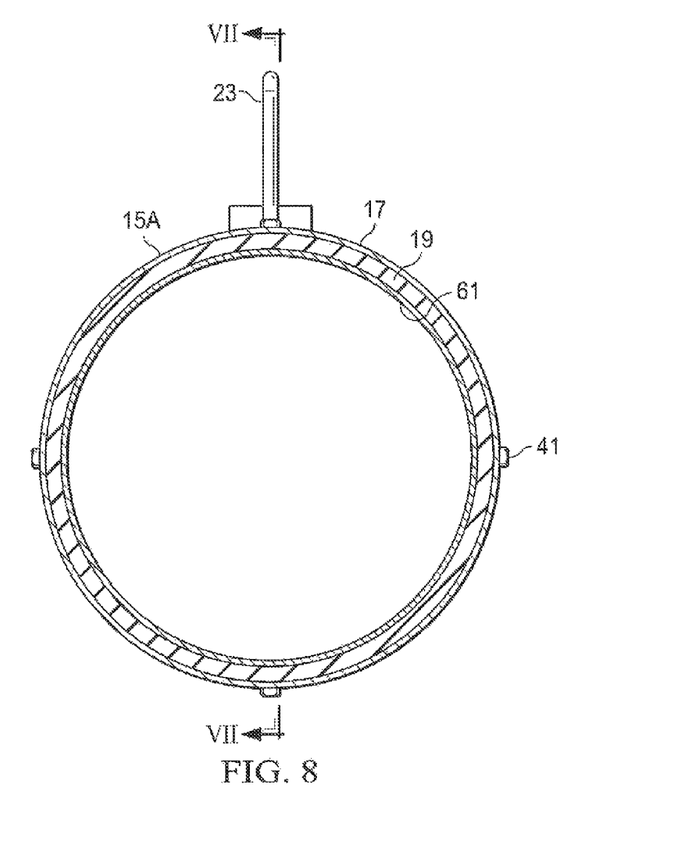
FIG. 8 is an end view of the pipe coupling of FIG. 7.
Figure 9:
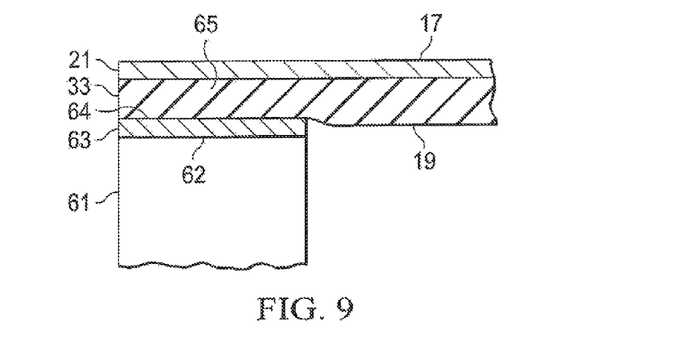
FIG. 9 is a detail longitudinal cross-sectional view of the inner ring and liner.

FIGS. 7-9 show another embodiment of the coupling 15A.

The inner liner 19 is joined to the outer shell 17 by inner rings 61, one in each end portion. In addition, the inner rings form the seal between the ends of the inner liner and the outer shell. The inner rings 61 are separate components from the outer shell 17. In the preferred embodiment, the inner rings each have a cylindrical inside surface 62 and a cylindrical outside surface 64 (see FIG. 9). Before assembly, the outside diameter of each inner ring is less than the inside diameter of the inner liner. This allows the liner 19 to be installed into the outer shell 17 and the inner rings 61 to be inserted into the end portions of the inner liner 19. The outer ends 63 of the inner rings 61 are flush with the ends of the outer shell and inner liner. The inner rings extend longitudinally into the pipe coupling for a distance that is sufficient to form a seal and couple the inner liner to the outer shell.

To couple or retain the inner liner to the outer shell, the inner rings 61 are hydraulically expanded toward the outer shell 17. The outer shell is located in a mold. Water or some other fluid is introduced into the interior of the coupling under high pressure, which expands the inner rings 61, but not the outer shell which is constrained by the mold. Once the inner rings are expanded, the outside diameter of the inner rings is increased and now greater than the inside diameter of the inner shell. The end portions 65 of the inner liner are compressed between the expanded inner rings and the outer shell, thus forming a circumferential seal at each end (see FIG. 9). In addition, this forms a strong attachment, with the inner rings retaining the inner liner to the outer shell. The wall thickness of each end portion 65 of the inner liner 19 is less than the wall thickness of the inner liner elsewhere due to being clamped between the inner ring and outer shell (see FIG. 9). Also, the wall thickness of the expanded inner rings is reduced slightly from the unexpanded inner rings. The ends 33 of the inner liner 19 are exposed and uncovered by the inner rings. Likewise, the outer ends 63 of the inner rings 61 are exposed. Even though the ends 33 of the liner may bulge slightly, the ends are effectively flush with the ends of the outer shell and inner rings.

The hydraulic expansion of the inner rings 61 provides a suitable retention and seal of the inner liner. The outer ends 63 of the inner rings are unconnected to the shell 17. However, bolts 41 can be used to provide additional security. The bolts 41 extend through the outer shell 17, the inner liner 19 and into the inner rings 61. Nuts 71 secure the bolts in place. The nuts are flush with the inside diameter of the inner rings.

To use the coupling 15, 15A, it is sized to the pipe 11 (see FIGS. 2 and 6). The inside diameter of the coupling, as measured inside of a clamp, should be at least ¼" larger than the outside diameter of the pipe. (In FIG. 6, the gap between the clamps 35 and the pipe 13 is exaggerated to better illustrate the flex of the inner liner 19.) The length of the coupling 15, 15A should be such that it covers a sufficient portion of the end of each pipe to make a seal. For example, for a pipe diameter of X, the coupling extends at least the same X distance, or longer, over the end of each pipe. The two pipe ends, which are clean and dry, are inserted into the coupling, with the pipe joint 39 being approximately centered in the coupling.

A compressor 51 (see FIG. 1), or other source of pressurized fluid, it connected to the fitting 27. In the preferred embodiment, compressed air is used, although pressurized liquid could also be used. If the pipeline is to be buried, then foam can be used to deform the inner liner 19. Continuing with the example of compressed air, compressed air is provided to the space 53 between the outer shell 17 and the inner liner 19. The outer shell is rigid and stiff compared to the inner liner. The outer shell 17 remains rigid while the inner liner 19 is forced away from the outer shell and deforms or inflates (see FIG. 6), contacting the entire circumference around each of the pipe ends. The inner liner forms a circumferential seal around each of the pipe ends. The seal extends from the pipe joint along a length of the pipe. Once pressurized, the outer shell is rigid and stiff.

The pressure applied to deform the inner liner 19 is greater than the pipeline pressure. For example, if the pipeline pressure is 60 psi, then the liner pressure is more, such as 65 psi or higher. If the pipeline pressure is 100 psi, then the liner pressure is at least 110 psi. If the pipeline experiences pressure surges, then the liner pressure should be increased to accommodate such surges.

Once the liner has been pressurized, the compressor can be disconnected from the fitting. If, upon testing the coupling, some leakage is observed, then the liner pressure can be increased by reconnecting the compressor and injecting additional compressed air or other fluid.

To disassemble the pipeline, the valve can be opened to vent the air and deflate the liner. If foam has been used to inflate the liner, then the coupling can be cut away.

The coupling provides a low cost, easy to use device for sealing a pipe joint. The coupling can be used on a variety of pipe types, even those pipes with rough or irregular outer surfaces. If a pipe has a particularly irregular outer surface, then the coupling can be made longer so as to seal against a longer portion of the pipe length.

The coupling not only joins two lengths of pipe together but provides a leak-tight seal. Many prior art couplings are leaky.

Figure 10:
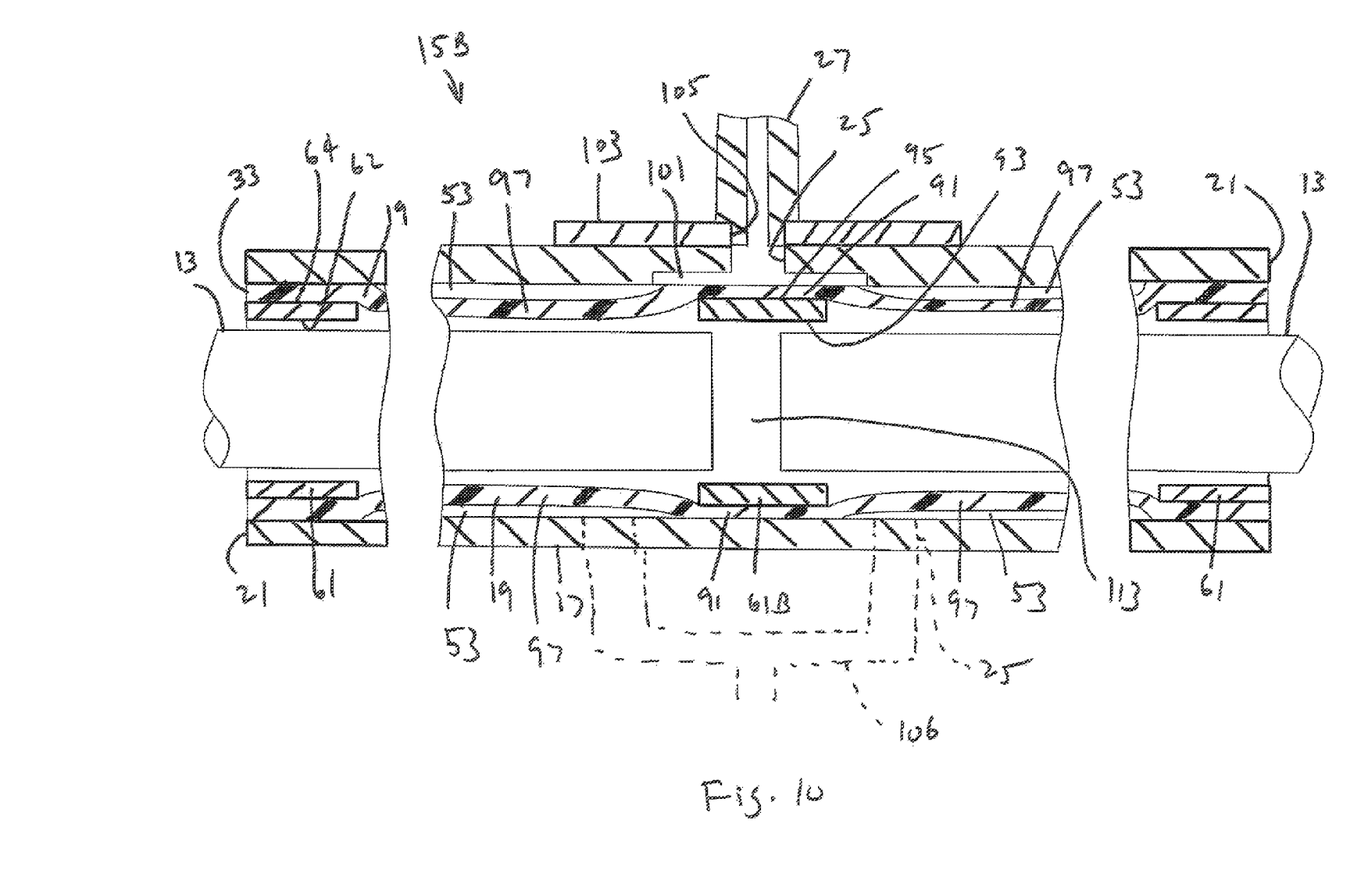
FIG. 10 is a cross-sectional view of the pipe coupling, in accordance with another embodiment.

FIG. 10 shows the pipe coupling 15B in accordance with another embodiment. The pipe coupling 15B is similar to the pipe coupling 15A of FIGS. 7-9 and has an outer shell 17, an inner liner or sleeve 19 and inner rings 61. The inner rings 61 are in each end portion of the shell. As discussed above with respect to the embodiment of FIGS. 7-9, the inner rings 61 each have an outside diameter that is initially less than the inside diameter of the inner liner. The inner rings 61 are inserted into the end portions of the inner liner and are hydraulically expanded toward the outer shell, which outer shell is located in a mold. This forms a seal between the sleeve and the shell at each end of the shell.

In addition to the inner rings 61 located in the ends of the coupling, the coupling also has an intermediate inner ring 61B. The intermediate inner ring 61B is located between the endmost inner rings 61 and engages an intermediate portion 91 of the inner liner 19. The intermediate portion 91 of the inner liner is between the two ends 33. In the preferred embodiment, the intermediate inner ring 61B is located midway along the length of the coupling between the two ends 33. This positions the intermediate inner ring 61B at the location of the two ends of the pipe 13.

The intermediate inner ring 61B has a cylindrical inside surface 93 and a cylindrical outside surface 95. Before assembly, the outside diameter of the intermediate inner ring 61B is less than the inside diameter of the intermediate portion of the inner liner. This allows the intermediate inner ring 61B to be inserted into the inner liner, and in particular into the intermediate portion of the inner liner.

Typically, the intermediate inner ring 61B is inserted into the inner liner before both of the endmost inner rings 61 are inserted. Once the intermediate inner ring 61B is inserted into the liner, then the endmost inner rings 61 are inserted into the ends of the inner liner as discussed above with respect to FIGS. 7-9.

The inner rings 61, 61B are hydraulically expanded toward the outer shell 17 using the same process described above with respect to FIGS. 7-9.

After expansion of the inner rings 61, 61B, the inner liner 19 is compressed between the expanded inner rings and the outer shell. Specifically, the inner liner 19 is compressed at the end portions 33 and at the intermediate portion 91. Circumferential seals are formed between the inner liner and the outer shell at the end portions 33 by the end most inner rings 61. A seal between the inner liner and the shell may be formed, but is not necessary, at the intermediate inner ring 61B. The intermediate inner ring 61B retains the intermediate portion 91 of the inner liner 19 against the outer shell 17, and prevents the expansion of the intermediate portion towards the ends of the pipe 13.

The inner liner has expandable portions 97 located between the intermediate inner ring 61B and the respective endmost inner rings 61. The expandable portions 97 are free to move or bulge outwardly toward the pipe located inside the coupling. The intermediate inner ring 61B divides the inner sleeve 19 into two expandable portions 97, with one expandable portion for each pipe end. Each expandable portion 97 of the inner sleeve 19 is capable of forming a circumferential seal against the respective pipe end.

A cavity 53 is formed in each expandable portion 97 of the inner liner 19 and the shell 17. A single opening 25 in the shell 17 can be used with an interior manifold. In the embodiment shown, the inside surface 99 of the outer shell 17 has passages 101 extending longitudinally from the opening 25 into each cavity 53. The passages 101 are narrow in the circumferential direction and preferably have abrupt edges with the inside surface of the outer shell so as to prevent the inner liner from sealing the passages. The passages provide communication between the opening 25 and each of the cavities 53. Thus, when air is provided to the opening 25, the air can enter the respective cavities 53.

In the drawings shown, the opening 25 is centered at the intermediate inner ring 61B, with a passage extending therefrom to each cavity. As an alternative, the opening 25 can be positioned in direct communication with one of the cavities, with a passage extending in the inside surface of the shell from the opening 25 to the other cavity.

This embodiment has an external plate 103 located about the opening 25 in the outer shell. The plate 103 is curved so as to couple to the outside diameter of the outer shell. The plate has an opening 105 aligned with the outer shell opening 25. The opening 105 has threads for receiving the fitting 27.

As an alternative, an external manifold can be used to fill the cavities 53. An opening 25 (shown in dashed lines in FIG. 10) in the outer shell is provided for each cavity 53. The openings are positioned on each side of the intermediate inner ring 61B. A manifold 106 (see dashed lines) is provided externally of the outer shell, which manifold has fitting for insertion into the respective openings. The manifold connects to the air compressor 51. A valve 29 and pressure relief valve 31 can also be provided.

To use the outer coupling 15B, the ends of the pipe 13 are inserted into the coupling, with the pipe joint being centered in the coupling. Although it is desired to have the pipe 13 ends contact or abut one another inside of the coupling, in the field this may not always be the case. A gap 113 may exist between the two pipe ends. When the inner liner is inflated with compressed air or other fluid, the expandable portions 97 expand and form circumferential seals around the respective pipe ends. The intermediate inner ring 61B retains the inner liner and prevents the inner liner from entering the gap 113 between the pipe ends. This preserves the inner liner and prevents damage to the inner liner from bending or deforming into the pipe gap.

Note that unlike the prior art U.S. Pat. Nos. 3,420,554 and 3,810,665, where a ring is located on a movable bladder causing the ring location to be uncertain, the intermediate inner ring 61B is fixed in location inside of the coupling. Once the intermediate inner ring 61B is expanded to the shell, it does not change position. The intermediate inner ring 61B retains the solid, single wall of the liner 19.

Although the ends of the liner 19 are shown as being sealed by the hydraulically expanded inner rings 61, other ways of sealing these ends can be used, some of which are discussed herein.

Figure 11:
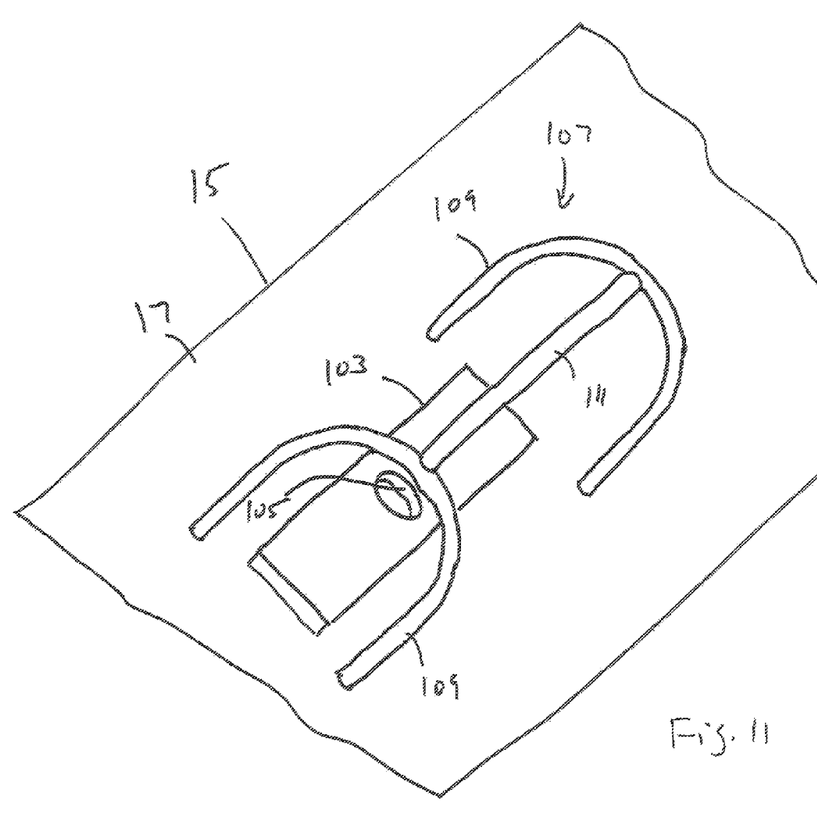
FIG. 11 is a perspective view of the handle arrangement of the pipe coupling, in accordance with another embodiment.

A handle 107 is provided to allow lifting and placement of the coupling, and also to protect the fitting 27 and attachments to the opening 25. The handle 107 has two ends 109, each shaped like an upside "U" and coupled to the outer shell. Each handle end 109 has two legs spaced apart from each other circumferentially. The legs extend radially out from the shell where they are coupled together. Each handle end 109 is longitudinally spaced from the opening 25. A longitudinal bar 111 extends between the two ends. The opening 25 is located circumferentially between the two legs of the each handle end 109. In the preferred embodiment, the handle components are made of round bar. If desired, more than one longitudinal portion can be used.

The handle 107 provides a protective area or cage having a circumferential width of the ends 109, a radial height of the ends and longitudinal length of the bar 111. This protective area houses the fitting 27, valve, etc. used to inflate the inner liner of the coupling. The handle protects against accidental knocking by foreign objects, which could lead to unintentional deflation of the inner liner and leakage from the coupling. A foreign object moving the proximity is more likely to strike the handle 107 than the fitting 27. The handle 107 can be used on all the couplings described herein.

The foregoing disclosure and showings made in the drawings are merely illustrative of the principles of this invention and are not to be interpreted in a limiting sense.

The invention claimed is:

1. A pipe coupling, comprising:
   a) an outer cylindrical shell having first and second ends;
   b) an elastomeric sleeve located inside of the outer shell and having respective first and second end portions, and an intermediate portion, the intermediate portion located between the respective first and second end portions;
   c) an inner ring located inside of the sleeve intermediate portion, the inner ring pressed out to the shell to retain the sleeve intermediate portion to the shell;
   d) the sleeve end portions being sealed to the outer shell;
   e) first and second cavities between the shell and the sleeve, the first cavity being between the sleeve intermediate portion and one of the sleeve end portions and the second cavity being between the sleeve intermediate portion and the other of the sleeve end portions;
   f) the shell having at least one opening that communicates with the first and second cavities;
   g) the sleeve having expandable portions that form the first and second cavities, the expandable portions being movable relative to the shell, the shell, the sleeve and the inner ring forming an interior for receiving a pipe joint, wherein the expandable sleeve portions expand around the pipe joint, the inner ring preventing the retained sleeve intermediate portion from expanding into the pipe joint.

2. The pipe coupling of claim 1, wherein the sleeve has a single wall with outer and inner surfaces, with the outer surface at the sleeve intermediate portion in contact with the shell and the inner surface at the sleeve intermediate portion in contact with the intermediate inner ring.

3. The pipe coupling of claim 2, wherein the sleeve intermediate portion is a solid wall.

4. The pipe coupling of claim 1, wherein the inner ring is hydraulically expanded to the shell.

5. The pipe coupling of claim 1, wherein the inner ring is an intermediate ring, further comprising:
   a) respective first and second endmost inner rings located at the respective sleeve first and second end portions;
   b) the first and second endmost inner rings pressed out to the shell to form the seals of the sleeve end portions to the shell.

6. The pipe coupling of claim 1, comprising at least one passage formed on an inside surface of the shell, the passage extending from the shell opening to one of the first and second cavities.

7. The pipe coupling of claim 1, wherein the opening in the shell is a first opening, the first opening communicating with the first cavity, further comprising a second opening in the shell that communicates with the second cavity.

8. The pipe coupling of claim 1, wherein:
   a) the sleeve has a single wall with outer and inner surfaces, with the outer surface at the sleeve intermediate portion in contact with the shell and the inner surface at the sleeve intermediate portion in contact with the intermediate inner ring;
   b) the sleeve intermediate portion is a solid wall;
   c) the inner ring is hydraulically expanded to the shell;
   d) the inner ring is an intermediate ring, further comprising:
      i) respective first and second endmost inner rings located at the respective sleeve first and second end portions;
      ii) the first and second endmost inner rings pressed out to the shell to form the seals of the sleeve end portions to the shell.

9. The pipe coupling of claim 1, further comprising a handle, the handle comprises two handle supports coupled to the shell and extending radially therefrom, the handle supports spaced apart longitudinally on an exterior of the shell, the opening located between the handle supports, the handle also comprising a member radially spaced apart from the shell and extending between the handle supports.

10. The pipe coupling of claim 9, wherein each of the handle supports comprises two legs coupled to the shell and extending radially from the shell, the legs spaced circumferentially apart on the shell, wherein the handle forms a protective cage about the shell opening.

11. A pipe coupling, comprising:
    a) an outer cylindrical shell having first and second ends;
    b) an elastomeric sleeve located inside of the outer shell and having respective first and second end portions, and an intermediate portion, the intermediate portion located between the respective first and second end portions;
    c) an inner ring located inside of the sleeve intermediate portion, the sleeve intermediate portion being compressed between the shell and the inner ring so as to be retained to an inside surface of the shell;
    d) the sleeve end portions being sealed to the outer shell;
    e) first and second cavities between the shell and the sleeve, the first cavity being between the sleeve intermediate portion and one of the sleeve end portions and the second cavity being between the sleeve intermediate portion and the other of the sleeve end portions;
    f) the shell having at least one opening that communicates with the first and second cavity;
    g) the sleeve having expandable portions that form the first and second cavities, the expandable portions being movable relative to the shell, the shell and the inner ring forming an interior for receiving a pipe joint, wherein the expandable sleeve portions expand around the pipe joint, the inner ring preventing the retained sleeve intermediate portion from expanding into the pipe joint.

12. The pipe coupling of claim 11, wherein the inner ring is hydraulically expanded to the shell.

13. The pipe coupling of claim 11, wherein the sleeve has a single, solid wall with outer and inner surfaces, with the outer surface at the sleeve intermediate portion in contact with the shell and the inner surface at the sleeve intermediate portion in contact with the intermediate inner ring.

14. The pipe coupling of claim 11, wherein the inner ring is an intermediate ring, further comprising:
    a) respective first and second endmost inner rings located at the respective sleeve first and second end portions;
    b) the first and second endmost inner rings pressed out to the shell to form the seals of the sleeve end portions to the shell.

15. The pipe coupling of claim 11, comprising at least one passage formed on an inside surface of the shell, the passage extending from the shell opening to one of the first and second cavities.

16. The pipe coupling of claim 11, wherein the opening in the shell is a first opening, the first opening communicating with the first cavity, further comprising a second opening in the shell that communicates with the second cavity.

17. The pipe coupling of claim 11, wherein:
   a) the inner ring is hydraulically expanded to the shell;
   b) the sleeve has a single, solid wall with outer and inner surfaces, with the outer surface at the sleeve intermediate portion in contact with the shell and the inner surface at the sleeve intermediate portion in contact with the intermediate inner ring;
   c) the inner ring is an intermediate ring, further comprising:
      i) respective first and second endmost inner rings located at the respective sleeve first and second end portions;
      ii) the first and second endmost inner rings pressed out to the shell to form the seals of the sleeve end portions to the shell.

18. The pipe coupling of claim 11, further comprising a handle, the handle comprises two handle supports coupled to the shell and extending radially therefrom, the handle supports spaced apart longitudinally on an exterior of the shell, the opening located between the handle supports, the handle also comprising a member radially spaced apart from the shell and extending between the handle supports.

19. The pipe coupling of claim 18, wherein each of the handle supports comprises two legs coupled to the shell and extending radially from the shell, the legs spaced circumferentially apart on the shell, wherein the handle forms a protective cage about the shell opening.

* * * * *